United States Patent
Kim et al.

(10) Patent No.: US 9,288,688 B2
(45) Date of Patent: Mar. 15, 2016

(54) COMMUNICATION SYSTEM FOR DETERMINING DATA TRANSMITTING SCHEME ACCORDING TO CHANNEL STATE

(71) Applicant: Electronics and Telecommunications Research Institute, Daejeon (KR)

(72) Inventors: Kyeong Pyo Kim, Daejeon (KR); Seung Eun Hong, Daejeon (KR); Jin Kyung Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 248 days.

(21) Appl. No.: 13/723,752

(22) Filed: Dec. 21, 2012

(65) Prior Publication Data

US 2013/0165050 A1  Jun. 27, 2013

(30) Foreign Application Priority Data

Dec. 23, 2011  (KR) .................. 10-2011-0141014

(51) Int. Cl.
| | | |
|---|---|---|
| H04M 1/00 | (2006.01) | |
| H04B 17/00 | (2015.01) | |
| H04W 16/28 | (2009.01) | |
| H04B 7/06 | (2006.01) | |
| H04B 7/04 | (2006.01) | |

(52) U.S. Cl.
CPC ............. *H04W 16/28* (2013.01); *H04B 7/0408* (2013.01); *H04B 7/0417* (2013.01); *H04B 7/0617* (2013.01); *H04B 7/0626* (2013.01); *H04B 7/0689* (2013.01)

(58) Field of Classification Search
CPC ...... H04B 7/06; H04B 7/0617; H04B 7/0619; H04B 7/0626; H04B 7/0408; H04B 7/0417; H04B 7/0421; H04W 16/28; H04W 72/046
USPC ............. 455/561.2, 561, 115.1, 115.2, 67.11, 455/67.14, 63.4, 69, 101, 103; 375/299, 375/347, 349
See application file for complete search history.

(56) References Cited

U.S. PATENT DOCUMENTS

| | | | | |
|---|---|---|---|---|
| 6,330,460 | B1* | 12/2001 | Wong et al. .................. | 455/562.1 |
| 6,665,545 | B1* | 12/2003 | Raleigh et al. ............. | 455/562.1 |
| 6,901,062 | B2* | 5/2005 | Scherzer et al. .............. | 370/335 |
| 2002/0132600 | A1* | 9/2002 | Rudrapatna ................ | 455/277.1 |
| 2002/0147953 | A1* | 10/2002 | Catreux et al. ................. | 714/746 |
| 2004/0014429 | A1* | 1/2004 | Guo ................................. | 455/73 |
| 2004/0214606 | A1* | 10/2004 | Wichman et al. ........... | 455/562.1 |
| 2006/0009168 | A1* | 1/2006 | Khan et al. .................... | 455/101 |
| 2006/0035608 | A1* | 2/2006 | Zhang et al. .................. | 455/129 |
| 2006/0083195 | A1* | 4/2006 | Forenza et al. ................ | 370/328 |

(Continued)

*Primary Examiner* — Duc M Nguyen
(74) *Attorney, Agent, or Firm* — Rabin & Berdo, P.C.

(57) ABSTRACT

Disclosed is a data transmission method that may enhance a channel capacity in a wireless channel environment of a frequency band having a high directivity in which a transmission apparatus may form a transmission beam and transmit a training signal while sequentially changing a direction of the formed transmission beam, a reception apparatus may form a reception beam and receive the training signal while sequentially changing a direction of the formed reception beam, and the transmission apparatus may receive a response signal from the reception apparatus with respect to the training signal and determine a data transmission scheme based on the received response signal.

9 Claims, 6 Drawing Sheets

(56) References Cited

U.S. PATENT DOCUMENTS

| | | | |
|---|---|---|---|
| 2007/0093274 A1* | 4/2007 | Jafarkhani et al. | 455/562.1 |
| 2007/0160156 A1* | 7/2007 | Melzer et al. | 375/260 |
| 2008/0227497 A1* | 9/2008 | Stirling-Gallacher et al. | 455/562.1 |
| 2009/0189812 A1* | 7/2009 | Xia et al. | 342/374 |
| 2010/0075672 A1* | 3/2010 | Jwa et al. | 455/434 |
| 2010/0173639 A1* | 7/2010 | Li et al. | 455/450 |
| 2010/0178884 A1* | 7/2010 | Nassiri-Toussi et al. | 455/101 |
| 2010/0267341 A1* | 10/2010 | Bergel et al. | 455/63.1 |
| 2010/0295730 A1* | 11/2010 | Jeon | 342/372 |
| 2010/0322337 A1* | 12/2010 | Ylitalo et al. | 375/267 |
| 2011/0059700 A1 | 3/2011 | Kim et al. | |
| 2011/0143807 A1* | 6/2011 | Aue et al. | 455/522 |
| 2011/0211490 A1* | 9/2011 | Nikula et al. | 370/252 |
| 2012/0281781 A1* | 11/2012 | Xiao et al. | 375/267 |

* cited by examiner

COMMUNICATION SYSTEM FOR DETERMINING DATA TRANSMITTING SCHEME ACCORDING TO CHANNEL STATE

CROSS-REFERENCE TO RELATED APPLICATION

This application claims the priority benefit of Korean Patent Application No. 10-2011-0141014, filed on Dec. 23, 2011, in the Korean Intellectual Property Office, the disclosure of which is incorporated herein by reference.

BACKGROUND

1. Field of the Invention

The present invention relates to a method of enhancing a channel capacity of a multi-transmit and receive antenna system in a wireless channel environment of a frequency band having a high directivity.

2. Description of the Related Art

Various schemes for enhancing a channel capacity based on a channel state in a wireless communication system have been researched.

In an environment such as an indoor environment in which a channel includes many multi-paths and scattering frequently occurs due to obstacles, a multi-antenna transmission and reception scheme of installing a plurality of transmit antennas and a plurality of receive antennas and thereby transmitting different data using the respective antennas may be employed.

In addition, a maximum ratio combination method in which a transmission apparatus may transmit the same data using a plurality of transmit antennas and a reception apparatus may group and thereby process signals using a plurality of receive antennas may be employed. Also, a beamforming method of enabling strength of a signal to be robust into a predetermined direction and thereby transmitting the signal using an array antenna may be employed.

SUMMARY

An aspect of exemplary embodiments provides a method of selecting a data transmission scheme capable of enhancing a capacity of a wireless channel in a frequency band having a high directivity.

According to an aspect of exemplary embodiments, there is provided a method of transmitting data, including: forming a beam into a predetermined direction using a plurality of antennas; transmitting a training signal to a reception apparatus while sequentially changing a direction of the formed beam, and receiving a response signal from the reception apparatus with respect to the transmitted training signal; and determining a data transmission scheme based on the received response signal.

The data transmission method may further include storing the direction of the formed beam when the response signal is received.

The data transmission method may further include: verifying the number of channel responses using the response signal; and verifying the presence of a multipath using the response signal. The determining may include determining the data transmission scheme based on the number of channel responses and the presence of the multipath.

The verifying of the presence of the multipath may include verifying the presence of the multipath based on the number of beams that receive the response signal, a magnitude thereof, and a direction thereof.

The verifying of the number of channel responses may include verifying the number of channel responses of which magnitude is greater than or equal to a predetermined threshold value, and of which time interval is greater than or equal to a predetermined time interval.

The determining may include determining the data transmission scheme so that a plurality of beams may be formed, and different data may be transmitted using each of the formed beams.

The determining may include determining the data transmission scheme so that a plurality of beams may be formed, and the same data may be transmitted using each of the formed beams.

The data transmission method may further include transmitting the data to the reception apparatus using the determined data transmission scheme.

According to another aspect of exemplary embodiments, there is provided a method of receiving data, including: forming a beam into a predetermined direction using a plurality of antennas; receiving a training signal from a transmission apparatus while sequentially changing a direction of the formed beam, and transmitting a response signal to the transmission apparatus in response to the received training signal; and receiving, from the transmission apparatus, data that is transmitted using a data transmission scheme determined based on the transmitted response signal.

The transmitted response signal may be used to verify the number of channel responses and the presence of a multipath, and the data transmission scheme may be determined based on the number of channel responses and the presence of the multipath.

The data may include first data and second data that is different from each other, and the data transmission scheme may be determined so that the transmission apparatus may transmit the first data and the second data using the plurality of beams, respectively.

Also, the data transmission scheme may be determined so that the transmission apparatus may repeatedly transmit the data using the plurality of beams.

According to still another aspect of exemplary embodiments, there is provided a method of transmitting data, including: forming a first transmission beam into a predetermined direction using a plurality of transmit antennas; transmitting a training signal to a reception apparatus while sequentially changing a direction of the formed first transmission beam; receiving a response signal from the reception apparatus with respect to the training signal that is received using a reception beam that is formed using a plurality of receive antennas, and of which direction is sequentially changed; determining a data transmission scheme based on the response signal; forming a second transmission beam based on the determined data transmission scheme; and transmitting data to the reception apparatus using the second transmission beam.

The second transmission beam may be formed to be plural, and the transmitting of the data may include transmitting different data to the reception apparatus using the plurality of second transmission beams.

The second transmission beam may be formed to be plural, and the transmitting of the data may include repeatedly transmitting the data to the reception apparatus using the plurality of second transmission beams.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
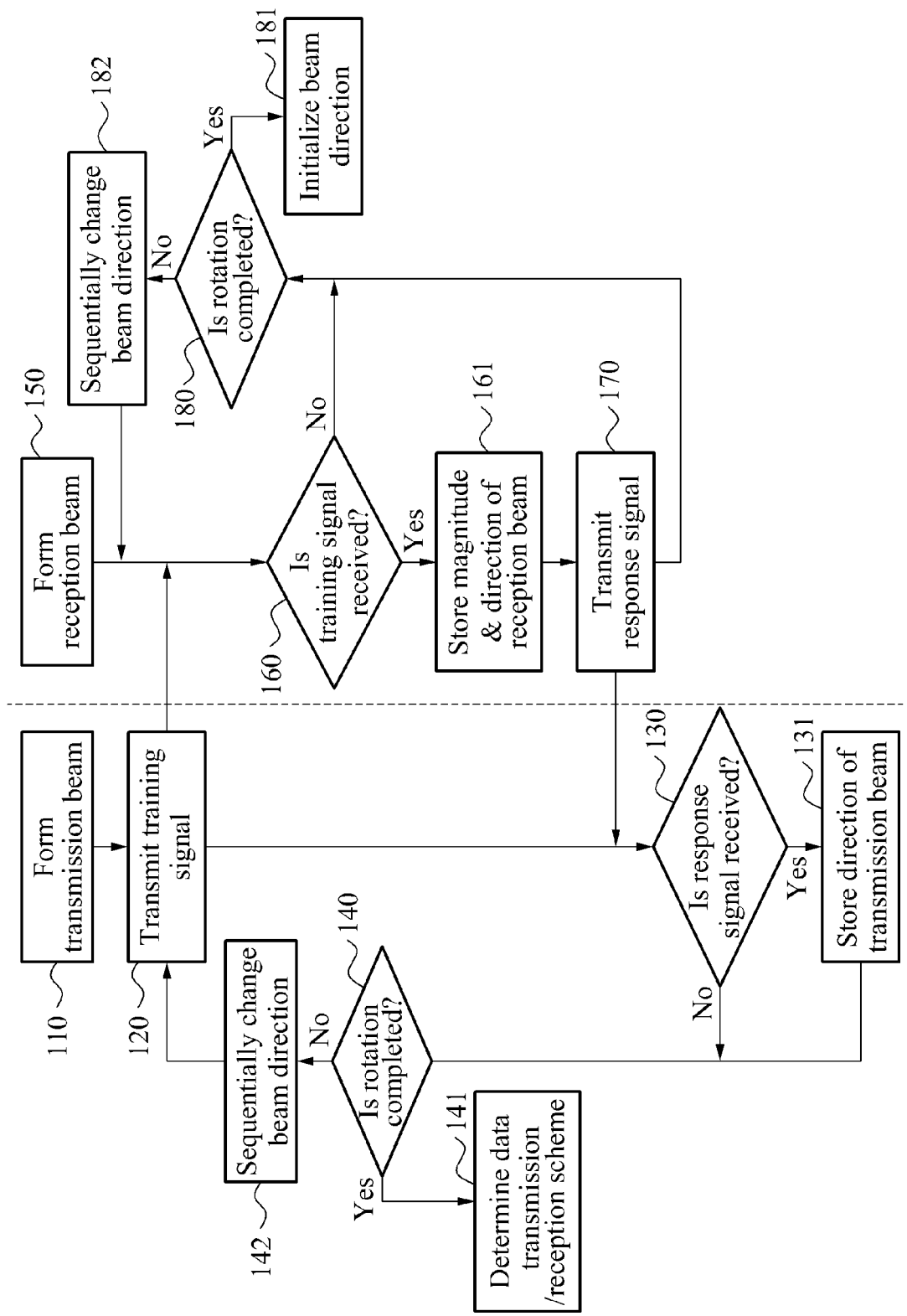
FIG. 1 is a flowchart illustrating a method of transmitting data according to an exemplary embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a flowchart illustrating a method of transmitting data according to an exemplary embodiment. In FIG. 1, an operation of a transmission apparatus is shown on the left of a dotted line and an operation of a reception apparatus is shown on the right of the dotted line.

In operation 110, the transmission apparatus may form a transmission beam using a plurality of transmit antennas. The transmission apparatus may select only a portion from among the plurality of transmit antennas and thereby form the transmission beam using only the selected transmit antennas. Since a beam width is determined based on the number of transmit antennas used to form a beam and thus, the transmission apparatus may determine the number of transmit antennas to be selected, based on a desired beam width.

In operation 150, the reception apparatus may form a reception beam using a plurality of receive antennas. The reception apparatus may select only a portion from among the plurality of receive antennas and thereby form the reception beam. Similar to a beam forming method of the transmission apparatus, the reception apparatus may determine the number of receive antennas to be selected, based on a desired beam width.

In operation 120, the transmission apparatus may transmit a training signal to the reception apparatus using the formed transmission beam.

In operation 130, the transmission apparatus may determine whether a response signal is received from the reception apparatus with respect to the training signal using the formed transmission beam. When the response signal is received, the transmission apparatus may store a direction of the transmission beam in operation 131.

In operation 140, the transmission apparatus may determine whether a rotation of the transmission beam is completed. According to an aspect, the transmission apparatus may sequentially rotate the transmission beam to cover all the coverage of the transmission apparatus. When the rotation of the transmission beam is completed, the transmission apparatus may determine a data transmission scheme in operation 141.

On the contrary, when the rotation of the transmission beam is not completed, the transmission apparatus may sequentially change a direction of the transmission beam in operation 142. When the transmission beam is rotated into a predetermined direction, the transmission apparatus may retransmit a training signal using the rotated transmission beam in operation 120.

In operation 160, the reception apparatus may determine whether the training signal is received from the transmission apparatus using the formed reception beam.

When the training signal is received, the reception apparatus may store a magnitude and a direction of the reception beam in operation 161 and may transmit a response signal to the transmission apparatus using the reception beam in operation 170. In this case, the response signal may include the direction of the reception beam, timing information of the training signal, and the like.

In operation 180, the reception apparatus may determine whether a rotation of the reception beam is completed. According to an aspect, the reception apparatus may sequentially rotate the reception beam to cover all the coverage of the reception apparatus. When the rotation of the reception beam is completed, the reception apparatus may initialize the direction of the reception beam in operation 181.

On the contrary, when the rotation of the reception beam is not completed, the reception apparatus may sequentially change the direction of the reception beam in operation 182. When the reception apparatus is rotated into a predetermined direction, the reception apparatus may determine whether the training signal is received using the rotated reception beam.

In the embodiment of FIG. 1, a transmission apparatus may form a transmission beam using a plurality of transmit antennas, and may transmit a training signal to a reception apparatus using the formed transmission beam. The reception apparatus may form a reception beam using a plurality of receive antennas, and may receive the training signal using the formed reception beam. When a direction of the transmission beam of the transmission apparatus matches a direction of a propagation path from the transmission apparatus to the reception apparatus, and when a direction of the reception beam of the reception apparatus matches a direction of a propagation path from the reception apparatus to the transmission apparatus, the reception apparatus may receive the training signal from the transmission apparatus.

When the reception apparatus and the transmission apparatus succeed in receiving and transmitting the training signal, respectively, and then store a corresponding beam direction, the reception apparatus and the transmission apparatus may be aware of the direction of the propagation path from the transmission apparatus to the reception apparatus.

Also, when the transmission apparatus receives the direction of the reception beam and timing information of the training signal using the response signal, the transmission apparatus may accurately verify information about the path from the transmission apparatus to the reception apparatus.

Figure 2:
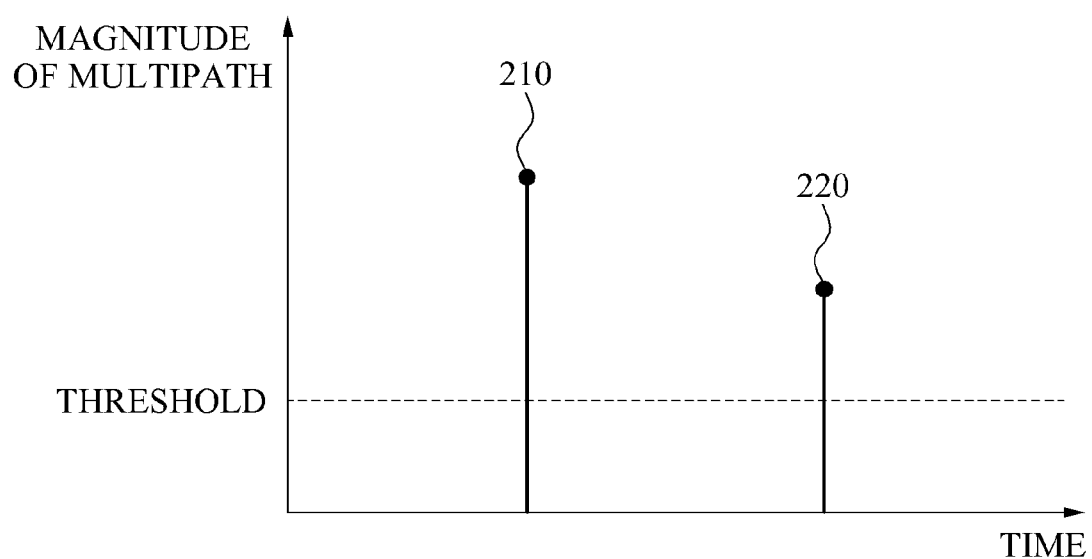
FIG. 2 is a graph to describe a concept of a multipath according to an exemplary embodiment.

FIG. 2 is a graph to describe a concept of a multipath according to an exemplary embodiment.

A training sequence transmitted from a transmission apparatus to a reception apparatus may be reflected from a neighboring object to thereby be transmitted to the reception apparatus. In this case, a training sequence 220 through a reflected path may be received later than a training sequence 210 through a direct transmission path.

According to an aspect, the transmission apparatus may determine a data transmission scheme based on a path of each of training sequences of which magnitude is greater than or equal to a predetermined threshold.

As one example, when a plurality of paths, for example, a multipath is present, the transmission apparatus may determine the data transmission scheme so that the same data may be transmitted with respect to each path. In this case, the reception apparatus may receive the same data that is transmitted via the respective paths, and may combine the received data. When an error occurs in data that is received via any one path, the error may be corrected using data that is received via another path. Accordingly, reliability of data transmission may be enhanced.

As another example, when the plurality of paths is present, the transmission apparatus may transmit different data with respect to each path. In this case, the reception apparatus may individually receive data that is transmitted via each path. Since different data is transmitted using each path, it is possible to enhance a data transmission rate by further efficiently employing assigned wireless resources.

Figure 3:
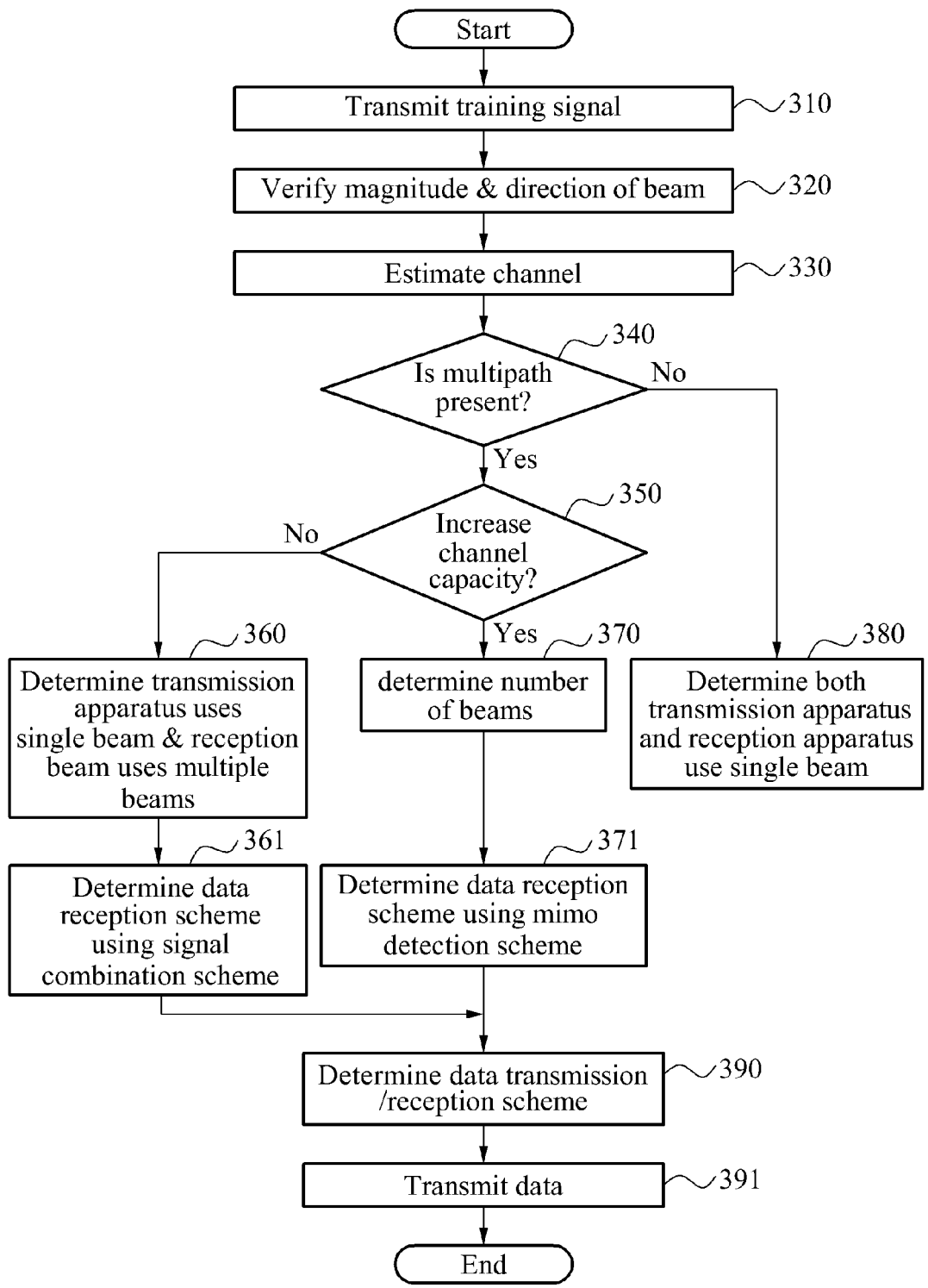
FIG. 3 is a flowchart illustrating a method of transmitting data according to another exemplary embodiment.

FIG. 3 is a flowchart illustrating a method of transmitting data according to another exemplary embodiment.

In operation 310, a transmission apparatus may transmit a training signal to a reception apparatus.

In operation 320, the transmission apparatus may receive a response signal from the reception apparatus, and may verify a magnitude and a direction of a transmission and reception beam based on the received response signal.

In operation 330, the transmission apparatus may estimate a channel from the transmission apparatus to the reception apparatus.

In operation 340, the transmission apparatus may determine whether a multipath having at least a predetermined magnitude is present in the channel from the transmission apparatus to the reception apparatus.

When the multipath is absent, only a single path may be present from the transmission apparatus to the reception apparatus. Accordingly, in operation 380, both the transmission apparatus and the reception apparatus may be determined to use a single beam.

On the contrary, when the multipath is present, the transmission apparatus may determine whether to increase a channel capacity in operation 350.

When the channel capacity is determined to be increased, the transmission apparatus may determine the number of beams based on the multipath in operation 370. That is, both the transmission apparatus and the reception apparatus may be determined to employ the number of beams corresponding to the number of paths that are included in the multipath.

In this case, the transmission apparatus may determine a data reception scheme so that the reception apparatus may receive data using a multiple input multiple output (MIMO) detection scheme in operation 371.

On the contrary, when the channel capacity is determined to not be increased, the transmission apparatus may be determined to employ a single beam and the reception apparatus may be determined to employ multiple beams in operation 360.

In operation 361, the transmission apparatus may determine the data reception scheme so that the reception apparatus may receive the data using a received signal combining scheme.

In operation 390, the transmission data may finally determine the data transmission scheme and the data reception scheme based on the determination result of the respective cases.

In operation 391, the transmission apparatus may transmit data to the reception apparatus using the determined data transmission scheme.

Figure 4:
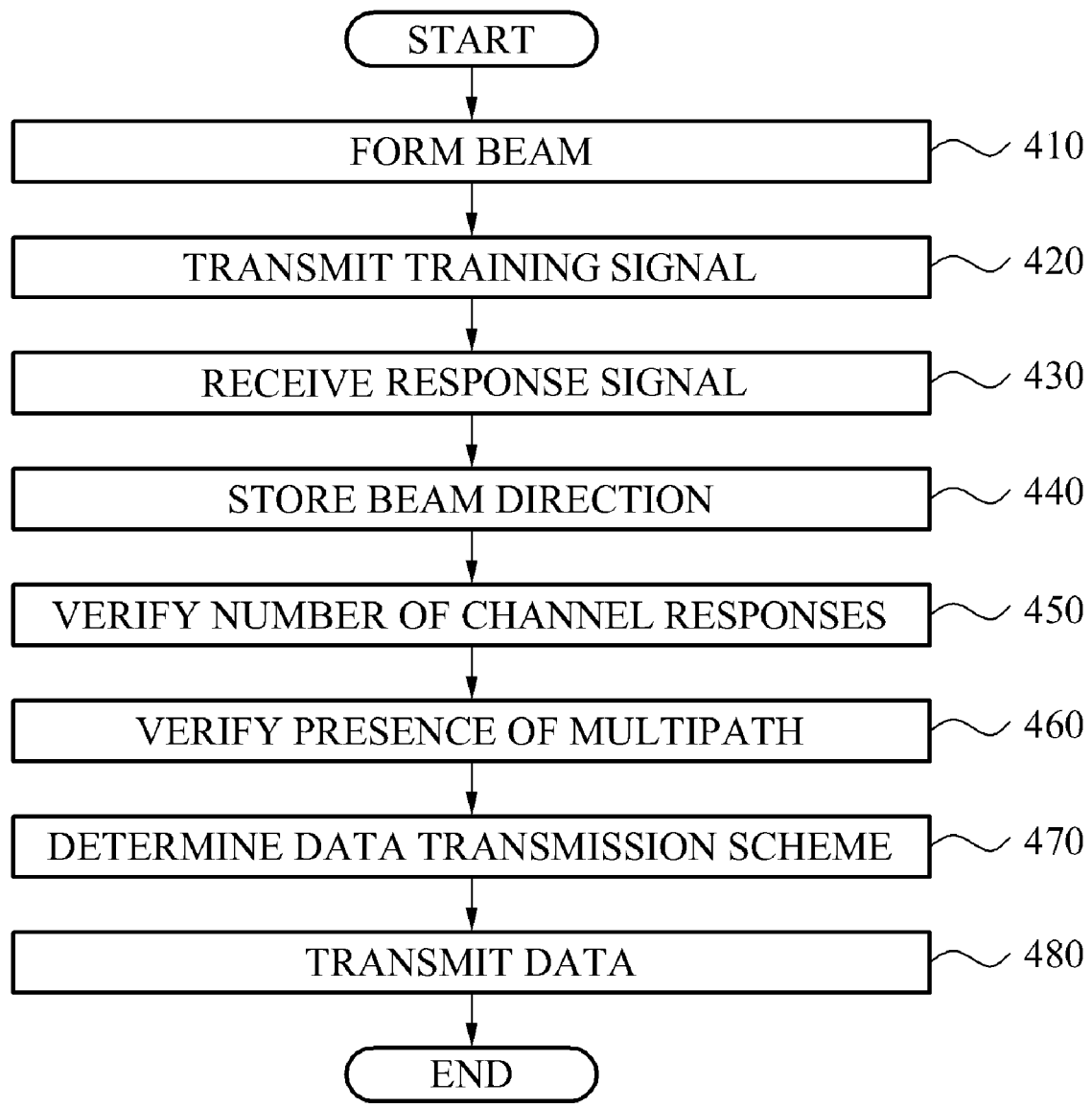
FIG. 4 is a flowchart illustrating a method of transmitting data according to still another exemplary embodiment.

FIG. 4 is a flowchart illustrating a method of transmitting data according to still another exemplary embodiment.

In operation 410, a transmission apparatus may form a beam into a predetermined direction using a plurality of antennas. According to an aspect, the transmission apparatus may form a beam by selecting only a portion from among a plurality of antennas. The transmission apparatus may form a beam by multiplying a weight to a transmission signal that is transmitted using each of the plurality of antennas.

In operation 420, the transmission apparatus may transmit a training signal to a reception apparatus.

In operation 430, the transmission apparatus may receive a response signal from the transmission apparatus with respect to the training signal. In operations 420 and 430, the transmission apparatus may perform transmission of the training signal and reception of the response signal while sequentially changing a direction of the beam. For example, the transmission apparatus may maintain the direction of the beam for a predetermined period of time after transmitting the training signal. When the response signal with respect to the training signal is not received within a predetermined period of time, the transmission apparatus may change the direction of the beam and retransmit the training signal.

When the response signal is received, the transmission apparatus may store a direction and a magnitude of a beam used to receive the response signal in operation 440.

In operation 450, the transmission apparatus may verify the number of channel responses using the response signal. The transmission apparatus may verify only the number of channel responses of which magnitude is greater than or equal to a predetermined threshold and of which time interval is greater than or equal to a predetermined time interval.

In operation 460, the transmission apparatus may verify the presence of a multipath using the response signal. The transmission apparatus may verify the presence of the multipath based on the number of beams that have received the response signal, a magnitude thereof, and a direction thereof.

In operation 470, the transmission apparatus may determine a data transmission scheme based on the response signal. The transmission apparatus may determine the data transmission scheme based on the number of channel responses and the presence of the multipath.

According to an aspect, the transmission apparatus may form a plurality of beams and may determine a data transmission scheme so that different data may be transmitted using each of the plurality of beams. In this case, the reception apparatus may enhance a data transmission rate by combining the different data.

According to another aspect, the transmission apparatus may form a single beam and may transmit data using the beam. In this case, the reception apparatus may enhance the reliability of data transmission by combining data that is transmitted using different paths.

In operation 480, the transmission apparatus may transmit data to the reception apparatus using the determined data transmission scheme.

Figure 5:
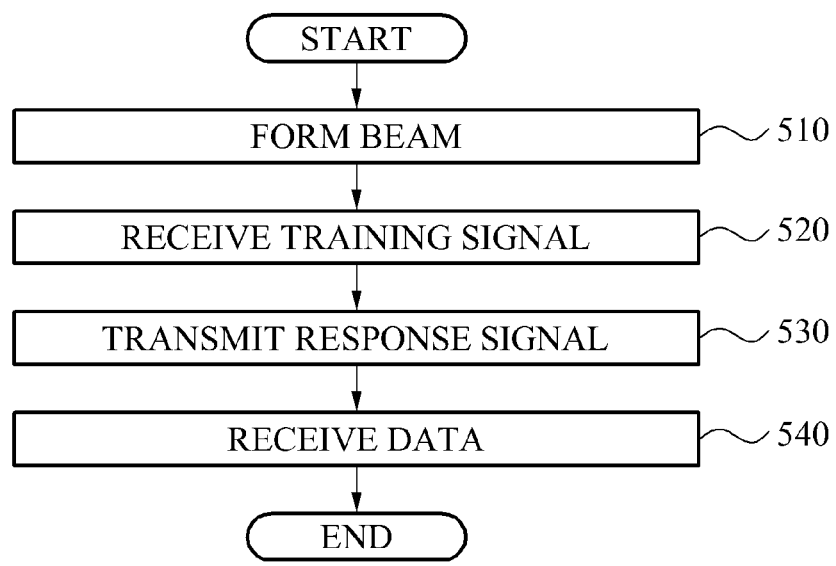
FIG. 5 is a flowchart illustrating a method of receiving data according to an exemplary embodiment.

FIG. 5 is a flowchart illustrating a method of receiving data according to an exemplary embodiment.

In operation 510, a reception apparatus may form a beam into a predetermined direction using a plurality of antennas.

In operation 520, the reception apparatus may receive a training signal from a transmission apparatus. The training signal may be transmitted from the transmission apparatus using a transmission beam that is formed by the transmission apparatus.

In operation 530, the reception apparatus may transmit a response signal to the transmission apparatus in response to the received training signal.

According to an aspect, in operations 520 and 530, the reception apparatus may perform reception of the training signal and transmission of the response signal while sequentially changing a direction of a reception beam. For example, the reception apparatus may maintain the direction of the reception beam and may receive the training signal again by changing the direction of the reception beam when the training signal is not received within a predetermined period of time. When the training signal is received, the reception apparatus may transmit the response signal with respect to the training signal before changing the direction of the reception beam.

The response signal may include information about the direction of the reception beam used when the training signal is received. The transmission apparatus may determine a data transmission scheme and a data reception scheme based on the response signal.

In operation 540, the reception apparatus may receive data from the transmission apparatus using the determined data reception apparatus.

According to an aspect, the transmission apparatus may form a plurality of transmission beams. In this case, the transmission apparatus may transmit first data using a first transmission beam and may transmit second data different from the first data, using a second transmission beam. The reception apparatus may form a plurality of reception beams corresponding to the plurality of transmission beams, respectively. The reception apparatus may receive the first data using a first reception beam and may receive the second data using a second reception beam.

According to another aspect, the transmission apparatus may form a single transmission beam. In this case, the transmission apparatus may transmit data by forming a transmission beam. Data transmitted using the transmission beam may be transmitted using a multipath. In this case, the reception apparatus may receive, using a first reception beam data that is transmitted via a first path, and may receive, using a second reception beam, data that is transmitted via a second path. When an error occurs in any of data transmitted using the respective paths, the reception apparatus may combine the data and thereby recover the error.

Figure 6:
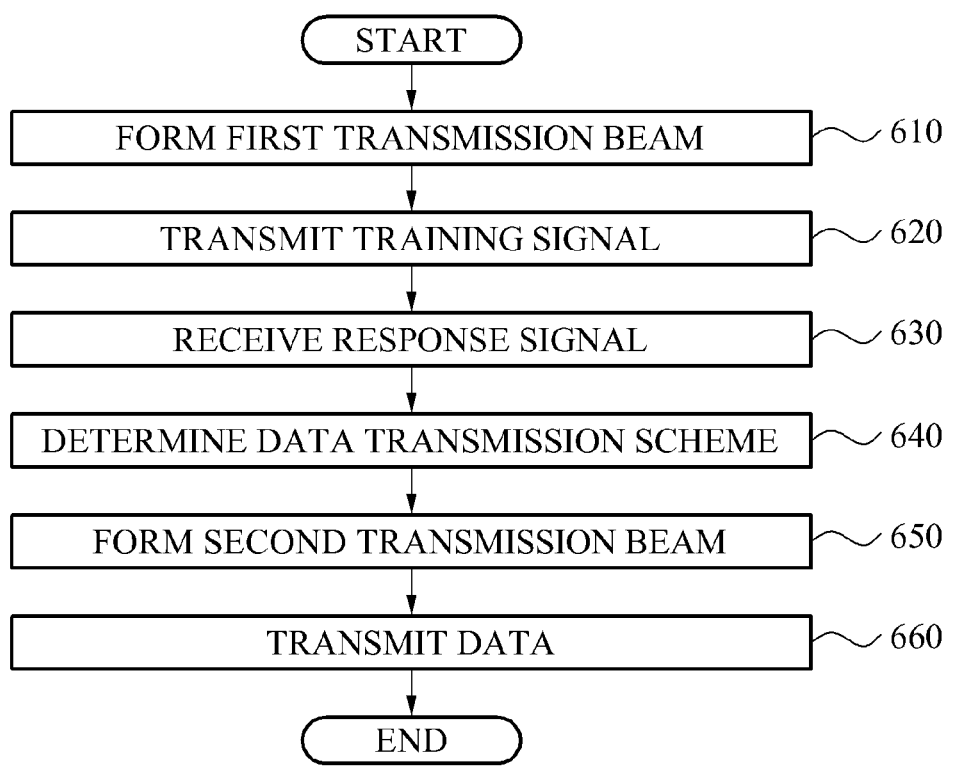
FIG. 6 is a flowchart illustrating a method of transmitting data according to yet another exemplary embodiment.

FIG. 6 is a flowchart illustrating a method of transmitting data according to yet another exemplary embodiment.

In operation 610, a transmission apparatus may form a first transmission beam into a predetermined direction using a plurality of transmit antennas.

In operation 620, the transmission apparatus may transmit a training signal to a reception apparatus using the first transmission beam.

In operation 630, the transmission apparatus may receive a response signal from the reception apparatus with respect to the training signal.

The transmission apparatus may perform operations 620 and 630 while sequentially changing a direction of a transmission beam. For example, when the response signal is not received after performing operation 620, the transmission apparatus may change a direction of the transmission beam and perform again operation 620.

On the contrary, when the response signal is received after performing operation 620, the transmission apparatus may store the direction of the transmission beam used to receive the response signal, and may change the direction of the transmission beam. After changing the beam of the transmission beam, the transmission apparatus may retransmit the training signal.

According to an aspect, the transmission apparatus may perform operations 620 and 630 while sequentially changing the direction of the transmission beam so that the direction of the transmission beam may cover all the coverage of the transmission apparatus.

In operation 620, the reception apparatus may also receive the training signal using a reception beam of which direction is sequentially changed. In operation 630, the reception apparatus may transmit the response signal to the transmission apparatus with respect to the training signal.

In operation 640, the transmission apparatus may determine a data transmission scheme based on the response signal. The transmission apparatus may form a plurality of second beams in operation 650, and may transmit different data to the reception apparatus using each of the plurality of second beams in operation 660.

According to an aspect, the transmission apparatus may transmit data using a single transmission beam. In this case, the reception apparatus may receive data, transmitted using multiple paths, using a plurality of reception beams, respectively.

The above-described exemplary embodiments of the present invention may be recorded in computer-readable media including program instructions to implement various operations embodied by a computer. The media may also include, alone or in combination with the program instructions, data files, data structures, and the like. The program instructions stored in the media may be specially designed and configured for the present invention, or may be known to those skilled in the art and thereby be implemented.

According to exemplary embodiments, it is possible to select a data transmission scheme capable of enhancing a capacity of a wireless channel in a frequency band having a high directivity.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of a transmission apparatus for transmitting data to a reception apparatus using a plurality of antennas, comprising:

forming a beam into a predetermined direction using the plurality of antennas;

repeatedly transmitting a training signal to the reception apparatus while sequentially changing a direction of the formed beam, each transmission being in a different direction, and receiving at least one response signal from the reception apparatus with respect to the transmitted training signals;

determining a number of channel responses based on a magnitude and a time interval of each of the at least one response signal;

determining presence of a multipath based on the determined number of channel responses, and a magnitude and a direction of each of the at least one response signal; and determining a data transmission scheme, which is one of
a first transmission scheme, in which a plurality of beams are formed and different pieces of the data are transmitted by each of the formed beams, and
a second transmission scheme, in which a plurality of beams are formed and a same piece of the data is transmitted by each of the formed beams, based on the determined number of channel responses and the determined presence of a multipath, for transmitting the data to the reception apparatus.

2. The method of claim 1, further comprising:
storing the direction of the formed beam when the response signal is received.

3. The method of claim 1, wherein the determining a number of channel responses comprises determining the number of channel responses of which the magnitude is greater than or equal to a predetermined threshold value, and of which the time interval is greater than or equal to a predetermined time interval.

4. The method of claim 1, further comprising:
transmitting the data to the reception apparatus using the determined data transmission scheme.

5. A method of a reception apparatus for receiving data, comprising:
forming a reception beam into a predetermined direction using a plurality of receive antennas;
receiving at least one training signal from a transmission apparatus that repeatedly transmits trainings signal to the reception apparatus while sequentially changing a direction of the formed reception beam, and transmitting at least one response signal to the transmission apparatus in response to the received at least one training signal; and
receiving, from the transmission apparatus, data that is transmitted using a data transmission scheme, which is one of
a first transmission scheme, in which a plurality of transmission beams are formed and different pieces of the data are transmitted by each of the formed transmission beams, and
a second transmission scheme, in which a plurality of transmission beams are formed and a same piece of the data is transmitted by each of the formed transmission beams,
determined based on the transmitted at least one response signal.

6. The method of claim 5, wherein:
the transmitted at least one response signal is used to verify a number of channel responses and the presence of a multipath, and
the data transmission scheme is determined based on the number of channel responses and the presence of the multipath.

7. The method of claim 5, wherein the receiving the data comprises receiving the transmitted data using the plurality of receive antennas and combining the received data.

8. A method of transmitting data, comprising:
forming a first transmission beam into a predetermined direction using a plurality of transmit antennas;
repeatedly transmitting a training signal to a reception apparatus while sequentially changing a direction of the formed first transmission beam, each transmission being in a different direction;
receiving at least one response signal from the reception apparatus with respect to the training signals;
determining a number of channel responses using the at least one response signal;
determining presence of a multipath using the at least one response signal; and
determining a data transmission scheme, which is one of
a first transmission scheme, in which a plurality of beams are formed and different pieces of the data are transmitted by each of the formed beams, and
a second transmission scheme, in which a plurality of beams are formed and a same piece of the data is transmitted by each of the formed beams,
based on the determined number of channel responses and the determined presence of a multipath;
forming a second transmission beam based on the determined data transmission scheme; and
transmitting data to the reception apparatus using the second transmission beam.

9. The method of claim 8, wherein the transmitted data is received by the reception apparatus using each of a plurality of reception beams.

* * * * *